United States Patent Office 3,763,290
Patented Oct. 2, 1973

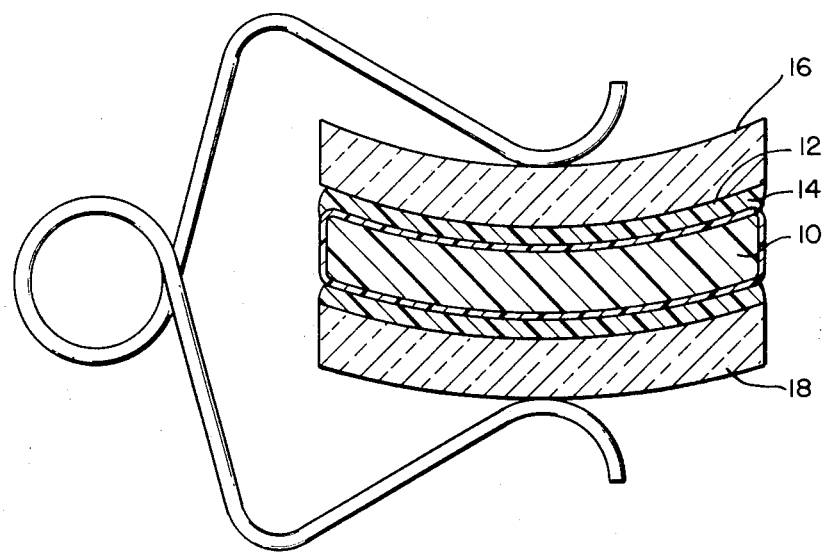

3,763,290
METHOD OF APPLYING MAR RESISTANT COATINGS TO TRANSPARENT BODIES OF SUPER STRONG PLASTICS
Clarence A. Sheld, Rochester, N.Y., assignor to Bausch & Lomb Incorporated, Rochester, N.Y.
Original application Mar. 30, 1970, Ser. No. 23,909, now Patent No. 3,673,055. Divided and this application Dec. 6, 1971, Ser. No. 205,431
Int. Cl. B29d 11/00
U.S. Cl. 264—1          3 Claims

ABSTRACT OF THE DISCLOSURE

Transparent bodies, particularly ophthalmic lenses, having cores of super strong plastic, outer surface layers of abrasion resistant thermosetting resins such as the allyl and methacrylic esters and an intermediate layer of a polyamide. The cores are of Bisphenol-A polycarbonate, or of a clear, heterogeneous blend known as ABS, which is a polyblend of three resins. The surface layer is polymerized in situ. The polyamide is selected from among those soluble in alcohol or a mixture of alcohol and hydrocarbons. It serves both as an adhesive to bond the surface layers securely to the cores and as a barrier agent to protect the cores from chemical attack by the monomer of the surface layer material. The surface layer is preferably cured in a mold which defines the shape and surface finish of the completed body.

This is a division of application Ser. No. 23,909, filed Mar. 30, 1970, and now Patent No. 3,673,055.

BRIEF DESCRIPTION

This invention relates to transparent bodies and methods of making them having cores of super high impact resistant resins, and surface layers of thermosetting resins that are much more resistant to abrasion than the resins of the cores.

The extremely high strength and impact resistance of Bisphenol-A polycarbonate are well known. Ophthalmic lenses about three millimeters thick made of it can withstand the impact of a quarter-inch steel ball at speeds of 900 feet per second. Another material of approximately equal strength is the plastic called ABS, commercially designated Toyolac plastic and made by Toyo Rayon Company (Japan). It is a heterogeneous blend of three different polymers: (1) a polymer of styrene-acrylonitrile-methylmethacrylate grafted onto a preformed rubber of styrene-butadiene; (2) a terpolymer of styrene-acrylonitrile-methylmethacrylate; and (3) a styrene-butadiene polymer. The first polymer is called the gel fraction, and it has a refractive index of 1.529. The second and third polymers together, are called the sol fraction, and their refractive indices are both 1.527. The gel fraction constitutes about 30% by weight of the ABS, and the sol fraction about 70%. For further details see a paper in the Journal of Applied Polymer Science, 11, No. 12, 2499 (1967).

These super strong materials have not, however, been widely adopted for use in ophthalmic safety lenses, because they are subject to abrasion and scratching, and lenses made of them have not been durable enough to satisfy industrial buyers.

Accordingly, a principal object of the invention is to improve the abrasion and scratch resistance of bodies made of Bisphenol-A polycarbonate or of ABS polymer blend.

Briefly, according to the invention, it has now been found that surface layers of abrasion-resistant materials such as the allyl and methacrylic esters may be applied by polymerization in situ to a body of Bisphenol-A polycarbonate or of ABS, if the body is first coated with a polyamide that is impenetrable to the monomer of the surface layer. The polyamide serves both as a barrier to prevent chemical attack by the monomer and as a cement to bond the surface layer to the body.

Many different polyamide resins have been found to be effective. The principal limitations governing the choice of a particular one of them, aside from the matter of cost, are that it be soluble in alcohol or in an alcohol-hydrocarbon mixture that does not attack the core material, that it be impenetrable by the monomer of the surface material, and that the solution of the polyamide resin in alcohol or the alcohol-hydrocarbon mixture be reasonably flowable at reasonable temperatures, preferably not significantly above 50° C. The polyamide is also preferably selected from among those having a refractive index of about 1.50, that is, as close as possible to the refractive index of the surface layer to be applied, so that surface irregularities of the polyamide will not be visible in the final product.

Among the polyamide resins that have given excellent results as intermediate layers between super strong bodies and surface layers of abrasion resistant thermosetting resins are:

(a) The solid thermoplastic fatty acid polyamides and the polyamidoamines derived from the condensation of dimerized vegetable oil acids with diamines or polyethylene polyamines;

(b) Aliphatic copolyamides based on combinations of polycaprolactam, poly(hexamethylene adipamide) and poly(hexamethylene sebacamide) in various proportions;

(c) Nylons derived from the polymerization of caprylactam (nylon 8); and (d) Alkoxyalkyl substituted polyamides derived from poly(hexamethylene adipamide).

These materials will be described in greater detail hereinafter.

DETAILED DESCRIPTION

Representative embodiments of the invention will now be described in greater detail in connection with the accompanying drawing, wherein the single figure is a cross-sectional view of an ophthalmic lens according to the invention during polymerization of its surface layer.

A lens according to an illustrative embodiment of the invention as shown in the figure includes a core 10 of bisphenol-A polycarbonate, a relatively thin surface layer 12 of diethylene glycol bis(allyl carbonate) polymerized in situ, and a bonding layer 14 of a polyamide resin between the core 10 and the surface layer 12. The bonding layer 14 is applied in solution by dipping, brushing, or spraying. The solvent is evaporated and the body is then placed between mold halves 16 and 18, with a thin layer of diethylene glycol bis(allyl carbonate) monomer around it. The monomer is then polymerized in situ. The mold halves 16 and 18 are optically finished, and shaped in accordance with the curvature desired for the finished lens so that only edging need be done after the lens is removed from the mold.

It has not been possible to apply coatings of abrasion resistant materials such as the allyl or methacrylic esters, or any other recognized hard and abrasion resistant resin directly on the phenolic polycarbonate or on the ABS polymer, because the monomers of the abrasion resistant materials all attack the phenolic polycarbonate and the ABS polymer chemically and opacify them. Also, the phenolic polycarbonate and the ABS polymer are highly resistant to adhesives. Only very few materials are known that will stick to them.

The problem in polymerizing a hard coating resistant to abrasion on the tough cores was two-fold. The cores had to be protected against chemical attack, and the coating material had to be securely bonded to them. The second requirement was especially severe, because of the rigorous treatment of the lenses during edging. Moreover, the barrier and bonding agent had to be transparent and colorless.

It has now been found that many polyamides satisfy these requirements. The preferred polyamides are the solid thermoplastic fatty-acid polyamides and polyamidoamines derived from the condensation of dimerized vegetable acids with diamines or polyethylene polyamines. For example, thermal polymerization of unsaturated vegetable oil fatty acids or esters from soybean, cotton seed, or corn oil, yields dimers, trimers, and higher polymers in complex mixtures commonly known as "dimer" acids. One typical "dimer" acid consists of 60% to 75% dimer acids such as the dimerized $C_{34}$ acid derived from linoleic acid, and 5% to 20% of trimers and higher polymers, plus a small amount of polybasic.

The mixture known as "dimer" acids condensed with ethylene diamine gives a hard resin, whereas when it is condensed with an amine having a functionality greater than two, such as for example, diethylene triamine, it yields a softer, liquid resin which is of branched, rather than linear structure. The liquid resins are not by themselves useful in the practice of the invention, but they may be used to advantage as admixtures with the solid resins.

In addition to polyamides from polymerized vegetable oil acids condensed with simple diamines and polyamines, many copolyamides are possible, and give satisfactory results in the practice of the invention. Dibasic acids and polybasic acids can be added to the "dimer" acid to modify the resulting polymer. Fatty acid polyamides in the molecular weight range of 3,000 to 10,000 are preferred, due to their solubility in alcohols at room temperature. Higher molecular weight polyamides resulting from careful purification of the "dimer" acid to remove monobasic acids and polybasic acids of functionality greater than two, yield, with a diamine, polyamides having limited solubility in alcohol at room temperature. Solutions of these resins in alcohols or alcohol-hydrocarbon mixtures may be applied to the polycarbonate cores in the practice of the invention at temperatures of about 50° C. and provide satisfactory results.

Commercial resins that have been found to be particularly effective as barrier and bonding agents on the polycarbonate and ABS cores are the 900 series Versamid resins, the 1100 and 1112 Versalon resins, and the Milvex 1000 resin, all products of General Mills, Inc. These resins may be used alone or in combination with each other, and in the composition and purity of the "dimer" acid They differ from each other primarily in molecular weight used in their manufacture.

Another group of polyamides that have been found to give good results in the practice of the invention are the aliphatic copolyamides based on combinations of polycaprolactam, poly (hexamethylene adipamide), and poly (hexamethylene sebacamide) in various proportions. While the homopolymers of these amides are not soluble in alcohol, the copolymers are soluble in mixtures of alcohol with chlorinated hydrocarbons at 50° C. The solutions, however, tend to form gels at room temperature, and, therefore, are not as convenient to use as the preferred polyamides.

A third group of polyamides, which is also suitable for use in the practice of the invention, are nylons derived from the polymerization of capryllactam (nylon 8) which have been found sufficiently soluble in alcohols for easy application to the polycarbonate and ABS cores.

A fourth group that has been found to give satisfactory results are alkoxyalkyl substituted polyamides derived from the alkoxylation of poly (hexamethylene adipamide) by reaction with formaldehyde followed by alkylation by reaction with a primary alcohol, resulting in a product having alkoxyalkyl side chains bonded to some of the backbone nitrogen atoms. One material of this type is the resin commercially designated BCI Nylon 819 (Belding Chemical Industries). In general, the solubility of these polyamides in alcohol depends in direct proportion on the degree of substitution, the highly substituted materials being more soluble than the less substituted.

The thicknesses of the polyamide layer 14 and of the abrasion resistant layer 12 are not critical in the practice of the invention. Typically, the polyamide barrier and bonding layer 14 is about .0001" to about .001" thick, and the surface layer 12 is about .001" to about .010".

The polyamide layer is preferably made just thick enough to ensure that it is impermeable to the monomer of the surface layer material. Any additional thickness tends to impair its bonding ability, apparently due to lack of adequate internal cohesion, or to changes in the distribution of strains within it. The preferred range of thickness for the layer of polyamide resin is, therefore, .0002" to .0004".

The surface layer of the alkyl polycarbonate must be thick enough to have "body," and to cover the entire lens despite differences in shape between the core coated with the polyamide resin and the cavity defined by the mold halves. Within this limit, it is preferably made as thin as possible to minimize the tendency of the finished surface layer to crack and break off in response to a heavy impact on the opposite face of the lens. The preferred range of thickness for the surface layers in the practice of the invention is .001" to .002".

EXAMPLE 1

A core for a safety lens three millimeters thick and fifty-five millimeters in diameter, and having both of its major surfaces lying on curves of six diopters (zero refractive power) was injection molded in the conventional way of Bisphenol-A polycarbonate. A solution was prepared consisting essentially of 87.5 grams of polyamide resin commercially designated Versalon 1100 dissolved in 330 ml. of isopropanol. Versalon 1100 is a polyamide resin derived from "dimer" acid as hereinabove described, and has a refractive index of 1.50 and a melting point of 105° C.

The core was dipped in the solution at ordinary room temperature and withdrawn at a rate of one inch per minute. It was then baked at 95° C. for one hour to evaporate the isopropanol and leave a thin film of the resin on its surface.

The core with the thin film of resin on it was then coated with a thin skin of diethylene glycol bis(allyl carbonate) polymer by the polymerization of the allyl monomer in situ upon both of its major surfaces. The allyl monomer was catalyzed with 12% isopropyl percarbonate based on the weight of the monomer. The procedure was as follows.

A few milliliters of the allyl monomer with the catalyst mixed into it were placed into the female half of a horizontally supported optically ground and polished mold. The resin coated core was then placed into the female half of the mold, forcing the monomer to run out into a thin layer. A second quantity of the monomer was then placed in the depression defined by the upper surface of the core, and the male mold half applied to it, forcing the added quantity of monomer to spread out over the upper surface of the core, between the core and the male half of the mold. The mold was then placed in a spring clamp, which applied about forty pounds total force and served to squeeze out air and part of the monomer. The assembly was then placed in an oven at 65° C. for twelve hours to polymerize the allyl carbonate.

Upon removal from the oven, the spring clamp was withdrawn from the mold, and the mold was treated in a methyl chloroform vapor degreaser for 20 seconds. The mold halves were then forced apart by gently tapping the edges with a tool, leaving a lens wtih surface layers of polymerized allyl carbonate, cemented in place by the film of polyamide resin.

Optical imperfections in the outer surface of the layer of the polyamide resin were not visible in the final product because the refractive indices of the polyamide resin and of the allyl carbonate polymer were very closely matched.

The coated lens was then bevel edged by tungsten carbide tipped cutters to conform to the shape of a standard safety lens, and tested for impact resistance. The test consisted of supporting it around its periphery upon a strong support and firing a hardened steel ball one-quarter inch diameter at it at a velocity of 700 feet per second. The ball bounced off the lens without penetrating it or causing any fragments to be dislodged from it.

EXAMPLE 2

This example is similar to Example 1, except that the initial injection molded core was made of the clear ABS polymer as hereinabove described, instead of Bisphenol-A polycarbonate. The lens of ABS polymer was treated in exactly the same way as described in Example 1 with the polyamide resin and the allyl carbonate to provide a high impact safety lens with an abrasion and scratch resistant surface.

EXAMPLE 3

The starting core was of Bisphenol-A polycarbonate and exactly similar to the core in Example 1. It was dipped into a solution of 100 grams of Versamid 940 in 500 ml. of butanol maintained at 50° C. Versamid 940 is the commercial designation of a polyamide resin made by copolymerization of di- and tri- linoleic acids with ethylene diamine. The core was withdrawn from the solution at a speed of one-half inch per minute, leaving a clear coating of the solution on it about .0002'' thick. The coated core was baked at 95° C. for one hour to evaporate the butanol, and was then coated with a copolymer of 90 parts allyl diglycol carbonate, and ten parts methylmethacrylate 54, polymerized in situ, applied as described in Example 1.

EXAMPLE 4

The core was of ABS polymer, as in Example 2. The polyamide solution consisted of 300 ml. of n-propanol and 50 grams of type 8 nylon made by polymerization of capryllactam, and was maintained at 50° C. The core coated with the polyamide was baked at 80° C. for two hours to evaporate the solvent, and was then coated with a polymer or ethyleneglycol dimethacrylate with 0.5% by weight of isopropyl percarbonate as a catalyst, polymerized in situ. The monomer was applied as described in Example 1, and was cured by placing the assembly of the mold with its contents and the clamping spring in an oven for one hour at 60° C. Upon removal of the finished coated lens from the mold and cooling to room temperature, a highly satisfactory safety lens was produced, having high impact resistance and fully commercially acceptable scratch and abrasion resistance.

EXAMPLE 5

The core was the same as in Example 1, of Bisphenol-A polycarbonate. The solution consisted of ethyl alcohol containing 20% by weight of an alcohol soluble nylon having approximately one-third of its —NH groups substituted with methoxy methyl groups (BCI Nylon 819). The solution was maintained at a temperature of 40° C., and a coating about .0002'' thick was deposited on the outer surface of the core by dipping as hereinabove described. The coated core was then baked at 120° C. for 30 minutes to evaporate the alcohol. A surface layer of diethyleneglycol bis(allyl carbonate) was then polymerized in situ on it as described in Example 1, using the allyl monomer catalyzed with 3% benzoyl peroxide and curing for 16 hours at 90° C. The results were entirely satisfactory in all respects including impact resistance, optical properties, and abrasion resistance.

EXAMPLE 6

The core was of Bisphenol-A polycarbonate as in Example 1. The solution consisted of warm methanol with 20% by weight of a copolyamide of nylon 6—6/6—6/10, available commercially as BCI Nylon 651, by Belding Chemical Industries. The copolyamide was applied and dried as described in the immediately foregoing examples. The final, abrasion resistant film consisted of a copolymer of 50 parts of allyldiglycol carbonate and 50 parts triallylcyanurate polymerized in situ using a conventional catalyst and curing conditions. The resulting product was a commercially acceptable safety lens having the well known abrasion resistance characteristic of the allyl plastic, the super impact strength of the polycarbonate, and high quality optical properties.

EXAMPLE 7 (UNSATISFACTORY)

The core was of Bisphenol-A polycarbonate exactly similar to the core in Example 1. An attempt was made to apply an abrasion resistant coating of allyldiglycol polycarbonate to it by polymerizing the carbonate in situ without first applying a polyamide protective layer. The monomer of allyldiglycol carbonate with 10% by weight of isopropyl percarbonate as a catalyst was pressed out into a thin film upon the core by applying two glass mold halves having surface curves mating with the curves of the core as described in Example 1. The allyl monomer was then cured by placing the mold assembly in an oven at 60° C. for 12 hours. Upon removing the mold halves, it was found that the polycarbonate core had been severely attacked by the allyl monomer and had become almost opaque and, therefore, useless as a lens.

Not all of the polyamides that are soluble in alcohol or alcohol-hydrocarbon mixtures give satisfactory results in the practice of the invention. The reason for this is not understood in terms of the chemical compositions of the polyamides. It appears, however, that certain of the commercially available polyamide compositions are not effective, when applied as coatings in the preferred range of thickness, to protect the cores of the super strong plastics from attack by the monomers of the abrasion resistant surface materials. For example, the fatty dimer acid derived polyamides commercially designated Versalon 1165 and Versalon 1140 have been found to be in this category and not to protect the cores adequately when applied in layers thin enough to produce the desired bonding strength between the cores and the surface layers.

It is a simple matter to ascertain the effectiveness of any particular polyamide composition. It is first applied as by dipping and drying to form a coating of the desired thickness on a test piece of the core material. A small quantity of the catalyzed monomer of the desired surface material is then placed on the polyamide coating, and the test piece is gently heated. If the polyamide composition is ineffective, the test piece will show visible signs of chemical attack within a few minutes, turbidity, and impairment of its optical clarity. If the polyamide is effective, no visible impairment of the test piece will occur.

What is claimed is:

1. Method of making a transparent body having a core of a super strong plastic and an outer surface of a material that has greater abrasion and scratch resistance than the core, said method comprising the steps of coating a core of a super strong transparent plastic selected from the group consisting of bisphenol-A polycarbonate and ABS with a solution of a polyamide resin in a solvent selected from the group consisting of alcohols and alcohol-hydrocarbon mixtures, causing the solvent to evaporate leaving a layer of polyamide resin on the core, then applying a monomer selected from the group consisting of allyl and methacrylic esters upon the layer of polyamide, and polymerizing the monomer in situ, said polyamide resin being selected from the group consisting of:

(a) the solid thermoplastic fatty acid polyamides and the polyamidoamines derived from the condensation of dimerized vegetable oil acids with diamines or polyethylene polyamines;

(b) aliphatic copolyamides based on combinations of polycaprolactam, poly (hexamethylene adipamide) and poly (hexamethylene sebacamide) in various proportions;

(c) nylons derived from the polymerization of capryllactam (nylon 8); and (d) alkoxyalkyl substituted polyamides derived from poly (hexamethylene adipamide).

2. Method of making an ophthalmic safety lens comprising the steps of:

(a) molding a core of a super strong plastic selected from the group consisting of bisphenol-A polycarbonate and ABS conforming approximately to the shape of the desired lens, (b) dissolving a polyamide resin in a solvent that does not chemically attack the core to form a solution, said polyamide resin being selected from the group consisting of (1) the solid thermoplastic fatty acid polyamides and the polyamidoamines derived from the condensation of dimerized vegetable oil acids with diamines or polyethylene polyamines, (2) aliphatic copolyamides based on combinations of polycaprolactam, poly (hexamethylene adipamide) and poly (hexamethylene sebacamide) in various proportions, (3) nylons derived from the polymerization of capryllactam (nylon 8), and (4) alkoxyalkyl substituted polyamides derives from poly (hexamethylene adipamide), (c) applying the solution so formed to the core to deposit enough of the dissolved polyamide upon the core to form a layer about .0001 inch to about .001 inch thick when the solvent is evaporated, (d) evaporating the solvent from the deposited layer, and then, (e) polymerizing a surface layer about .001 inch to .01 inch thick of a thermosetting resin selected from the group consisting of allyl and methacrylic esters upon the deposited layer in situ.

3. The method according to claim 2 in which the polymerizing step is carried out in a mold having a cavity defining the contours of the desired finished lens.

References Cited
UNITED STATES PATENTS

| | | | |
|---|---|---|---|
| 3,019,131 | 1/1962 | Haas et al. | 351—166 X |
| 3,484,157 | 12/1969 | Crandon et al. | 351—166 |
| 3,265,763 | 8/1966 | Deichert et al. | 264—1 X |
| 3,396,214 | 8/1968 | Crandon | 264—1 |
| 3,465,076 | 9/1969 | Asami et al. | 351—166 UX |
| 2,481,809 | 9/1949 | Barnes | 264—1 |

ROBERT F. WHITE, Primary Examiner

A. M. SOKAL, Assistant Examiner

U.S. Cl. X.R.

117—72; 264—135